Oct. 31, 1961     D. V. MALEC     3,006,314
GAS TANK OIL GAUGE
Filed Dec. 14, 1959
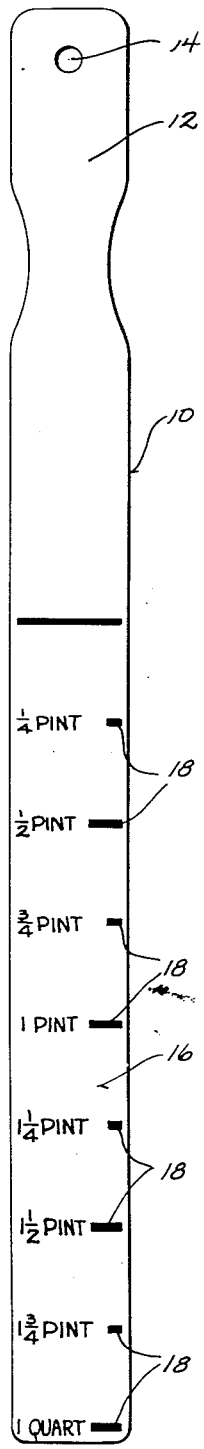
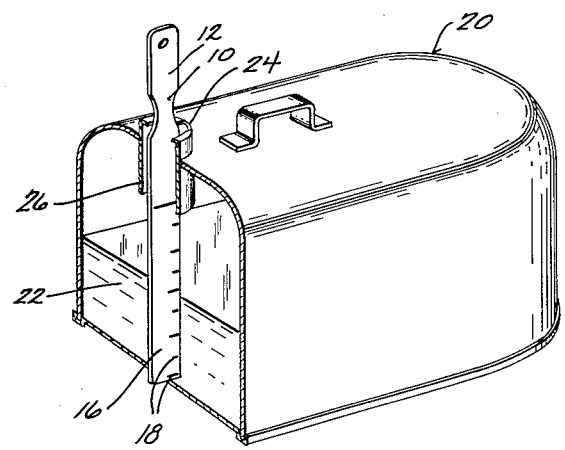
INVENTOR.
DAVID V. MALEC
BY
Wheeler, Wheeler & Wheeler
ATTORNEYS

United States Patent Office 3,006,314
Patented Oct. 31, 1961

1

3,006,314
GAS TANK OIL GAUGE
David V. Malec, Pewaukee, Wis., assignor to Outboard Marine Corporation, Waukegan, Ill., a corporation of Delaware
Filed Dec. 14, 1959, Ser. No. 859,246
2 Claims. (Cl. 116—118)

The present invention relates to a gauge for a tank containing a mixture of components in predetermined ratio. The gauge of the present invention indicates, at any partially empty state of the tank, the amount of one of the mixture components necessary to be added to the tank prior to filling the tank with the other mixture components to result in a mixture of desired ratio. In one sense the gauge of the present invention is similar to a deficiency gauge in that it relates indirectly to the unfilled portion of the tank. However this is not a deficiency gauge in that it does not show how much liquid is required to fill the tank, but only shows how much of one component should be added before the tank is filled with a different component. The spacing between gauge graduations is a function of the desired ratio of mixture components.

The present invention is particularly useful with fuel tanks which contain oil-gasoline mixture used for powering and lubricating two cycle gasoline engines such as outboard motors. In order to obtain the required mixture ratio, as for example, ⅓ of a pint of oil to a gallon of gasoline, it has been past practice to buy the mixture in whole gallon multiples. This practice enables the vendor to easily mix the desired ratio but results in running the tank dry or carrying more than one tank of fuel. In outboard motors it was customary to periodically fill the engine tank from an additional tank of one or more gallons of fuel carried in the boat. The newer models of outboard motors have detachable fuel tanks capable of carrying fuel mixtures in amounts of several gallons. A tank of this type is connected to the engine and the fuel is pumped from it. It is therefore frequently desirable to fill the fuel tank to capacity at a time when the tank is only partly empty.

The present invention includes a gauge for use with a tank of predetermined volume and configuration. The gauge indicates at any partly empty level of the tank the required amount of oil to be added to the tank which will result in a gasoline-oil ratio of ⅓ of a pint to a gallon when the tank is subsequently filled with gasoline.

In the drawings:

FIG. 1 is a front elevation of a gauge embodying the present invention;

FIG. 2 is a perspective view of the gauge on a reduced scale, as it appears in a fragmentarily illustrated tank for which it was designed to show at any given time the amount of oil required for admixture with fuel to fill the tank to the top level shown on the gauge.

There is shown in FIG. 1 of the drawings a gauge stick 10 having a handle 12. Gauge stick 10 has a scale portion 16. Scale portion 16 may be inserted to the bottom of a tank 20 (FIG. 2) which is partially filled with liquid 22 which is described in this application as a gasoline and oil mixture.

It has been found that an unfinished wooden gauge stick having the scale printed thereon in ink is appropriate in the practice of the invention. Usefulness of such a gauge depends upon "reading" the wet mark thereon; therefore liquid repelling materials are undesirable for such a gauge stick.

Scale portion 16 is provided with a series of spaced

2 graduations 18. The spacing of the graduations 18 will vary with the shape and volume of a particular tank. Graduations 18 will also vary dependent upon the type and ratio of the final mixture desired. Gauge stick 10 was specifically designed for the tank 20 illustrated in FIG. 2. The graduations 18 on gauge stick 10 do not represent the amount of mixture or even the amount of fuel mixture 22 is shown partially filling the interior of particular case graduations 18 are spaced on gauge stick 10 with the smallest numbers ("¼ pint") near the top of the gauge stick and the largest numbers ("one quart") at the bottom.

In the partial perspective view shown in FIG. 2, the fuel mixture 2 is shown partially filling the interior of tank 20. Gauge stick 10 is shown inserted to the bottom of tank 20 through filling spout 24, which has a neck 26 extending downwardly into the interior of the can. The mixture 22 will leave a wet mark on gauge stick 10 when the stick is removed from tank 20. The relation of the wet mark to the proximate graduations 18 will indicate how much oil must be added to the tank 20, preliminary to filling the tank with fuel so that when the can is filled to capacity with gasoline the resultant mixture will be in the desired ratio. (In practice this is currently ⅓ of a pint of oil to a gallon of gasoline). The neck 26 will trap air in tank 20 to preclude further filling above the level of the neck, it being desirable to leave an air space for expansion in response to temperature change. Thus the tank is "full" when the mixture therein extends to the lower end of neck 26.

What is claimed is:

1. A gauge insertable within a fuel tank of predetermined volume and configuration and to be filled with a mixture of components in a desired ratio, the gauge determining the quantity of one mixture component to be added to the tank to complete a tank of fuel mixture of desired ratio when the tank is filled with another mixture component, said gauge comprising a stick wettable by the mixture and having a handle at one end and a scale comprising graduations marked on the stick and having numerical designations progressively increasing from the handle to the other end, each such designation indicating, when the stick is wet to the level of said designation, the amount of one of said components to be added to the tank preliminary to filling the tank with the other of said components.

2. The combination with a tank of predetermined volume and configuration containing a fuel and oil mixture, of a gauge stick having its lower end insertable into said tank, said gauge having a scale thereon inversely proportional to the volume of said tank, said scale including a plurality of spaced graduations, the spacing of said graduations being a function of a predetermined fuel and oil ratio, said graduations having numerical designations arranged to indicate the oil component of said mixture in quantities successively decreasing upwardly from said lower end, whereby upon insertion of said gauge stick into said tank to the bottom thereof, and subsequent extraction therefrom, the wet mark of the fuel and oil mixture on said scale will indicate the quantity of oil which must be added to the tank to complete a fuel and oil mixture of desired ratio when the tank is filled to capacity with fuel.

References Cited in the file of this patent

UNITED STATES PATENTS

| | | |
|---|---|---|
| 922,152 | Kent | May 18, 1909 |
| 1,475,183 | Harwood | Nov. 27, 1923 |
| 1,521,668 | Bond | Jan. 6, 1925 |

UNITED STATES PATENT OFFICE
CERTIFICATION OF CORRECTION

Patent No. 3,006,314                                              October 31, 1961

David V. Malec

It is hereby certified that error appears in the above numbered patent requiring correction and that the said Letters Patent should read as corrected below.

Column 2, line 8, for "fuel mixture 22 is shown partially filling the interior of" read -- fuel contained in, or to be added to, tank 20. In this --; line 14, for "2" read -- 20 --.

Signed and sealed this 10th day of April 1962.

(SEAL)
Attest:

ERNEST W. SWIDER                                              DAVID L. LADD
Attesting Officer                                                Commissioner of Patents